Figure 6:
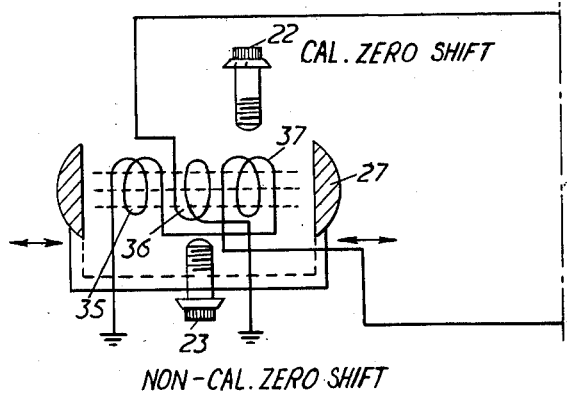

Jan. 30, 1962   R. M. O'BRIEN   3,018,556
MEASURING AND GAUGING DEVICES
Filed Nov. 17, 1958   3 Sheets-Sheet 1
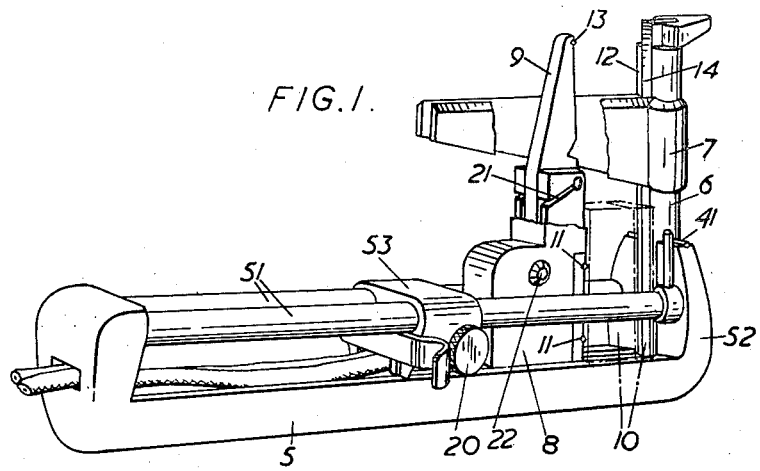
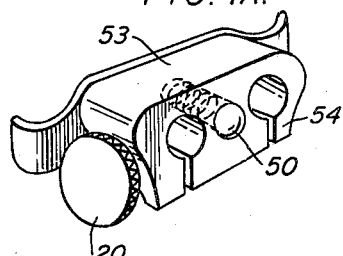
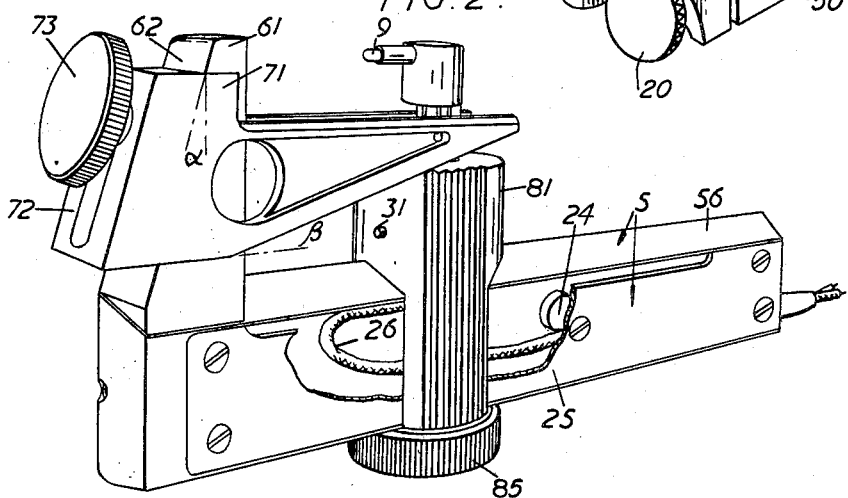
Inventor
RORY MORGAN O'BRIEN
By
Attorney

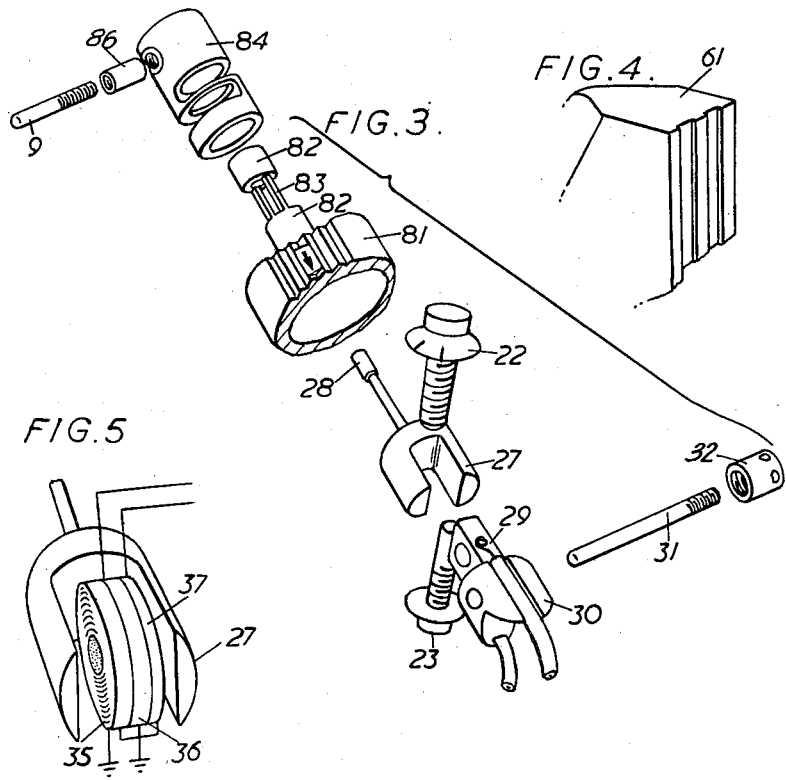

Jan. 30, 1962  R. M. O'BRIEN  3,018,556
MEASURING AND GAUGING DEVICES

Filed Nov. 17, 1958  3 Sheets-Sheet 3

Inventor
RORY MORGAN O'BRIEN
By H.D. Willson
Attorney

United States Patent Office 3,018,556
Patented Jan. 30, 1962

3,018,556
MEASURING AND GAUGING DEVICES
Rory Morgan O'Brien, Welwyn Garden City, England, assignor to Watton Engineering Co. Limited
Filed Nov. 17, 1958, Ser. No. 774,394
31 Claims. (Cl. 33—147)

The present invention relates to improvements in measuring and gauging instruments or devices. Where measurements of the order of .0001" are required mechanically operated devices are often unsatisfactory and devices based on the use of a transducer to produce a variable signal and an amplification of such signal have been proposed, but such devices are not generally satisfactory for workshop use. The primary object of the present invention is to provide a device which is sufficiently reliable, rugged and foolproof for workshop use and which is conveniently operable for making fine comparison measurements of the order referred to or even for finer measurements if required.

In making measurements of this order it is impractical to provide for direct measurements and it has therefore been usual to use gauges of accurately known dimensions (slip gauges) and the workpiece has been compared with such gauges, the apparatus concerned being therefore referred to as "comparators." Any such comparator must include a zero adjusting device and it has been found that such adjuster device must be reset from time to time to preserve accuracy, such resetting being in particular necessary whenever the reference gauge or gauges is or are changed for measuring another size.

A more specific object of the present invention is to provide a manually held comparator suitable for workshop use which is rugged yet reliable and can be satisfactorily operated by production personnel to give a required degree of accuracy in the measurement of workpieces, and, for example, of the order above referred to.

In accordance with the present invention, a comparator is provided having a movable part of the device which can set in appropriate position for a particular measurement by engagement with a gauge or gauges pertaining to said measurement, and said movable member is associated with or carries a displaceable feeler adapted to be presented to the workpiece, the movement of said feeler being detected by an electrical circuit device to provide an output which can be amplified if necessary, and utilised to provide a measurement in comparison with the gauge or gauges.

In one form of the invention a measuring device comprises a stock having a work-engaging face, a member movable on said stock having a bearing face element adapted to engage a gauge or gauges positioned between the stock and said movable member to set the latter into a predetermined position, and a feeler engageable by a workpiece to provide a comparative measurement as between the gauge and the workpiece.

The present invention further contemplates two separate zero adjuster means, one being calibrated and the other being uncalibrated, and either of them permits a responder device or indicator operatively associated with the feeler to be set to the zero condition or position, and of which the calibrated zero adjuster provides a built-in fiducial and optionally a reading, in some cases a co-relative reading, of the required measurement.

According to a further feature of the present invention an automatically positioned work stop is provided appropriate for the gauging of circular workpieces, to ensure that measurement is performed across the diameter of such a circular workpiece.

Conveniently the movable work-engaging feeler operates an electromagnetic transducer housed in the movable member and is connected through external leads to a separate unit comprising a signal amplifier and an indicating meter or other equivalent means for registering or recording the wanted measurements, the calibrations of the calibrated zero shift means being in this case co-related to the scale calibrations of the meter.

Preferably the transducer is designed to produce an output varying in amplitude and phase. An alternating input to the transducer is derived from a suitable oscillator also controlling the operation of a coherent detector which receives an amplified signal from the transducer to provide an output to an indicating meter depending upon the displacement of the feeler and effective each side of the zero ocndition. Preferably provision is included to compensate any spurious quadrature signals reaching the amplifier thereby avoiding overloading of the amplifier by such quadrature signals and ensuring that a linear scale is obtained on the indicating meter.

Figure 7:
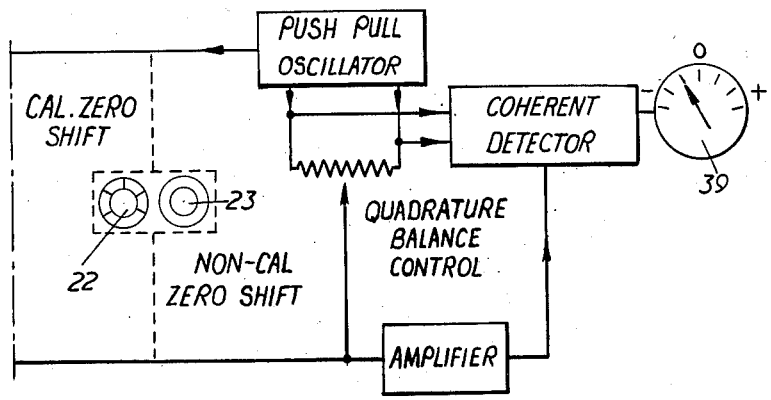

Various features of the present invention are shown on the accompanying drawings wherein:

FIG. 1 is a general view in perspective of one embodiment of a comparator according to the invention, FIG. 1a is a detail view showing the slidable presser member part of the comparator of FIG. 1, FIG. 2 represents another form of the comparator, FIG. 3 is an exploded view of the feeler mounting and of the associated transducer, FIG. 4 is a detailed view of the operative face of the anvil part of the comparator, FIG. 5 is a diagrammatic view of the transducer, FIGS. 6 and 7 are explanatory circuit diagrams.

Referring to FIG. 1, a hand-held holder or stock 5, conveniently formed of light alloy and comprising a U-shaped guide and guide bars 51, is provided at one end with an upstanding arm or anvil 6 slidably accommodating a work stop 7 for use when gauging round stock. The upstanding arm or anvil 6 includes a pin 41 which engages V-depressions in a head 52 of the holder 5, the arm being drawn into a housing in the head 52 by a screw not shown. The holder 5 slidably accommodates a carrier 8 housing a transducer assembly such as shown in FIG. 3 and having a feeler or gauging arm 9. One or more slip gauges 10 may be fitted to the holder within the space bounded by the guide bars 51, the carrier 8 and the arm 6, and in this form they may remain in position during further operations. The work stop 7 has a suitable inclined under face and is adjustable on the arm 6 so that circular workpieces can be correctly positioned in relation to the feeler arm 9 and the knife edges 12, 14 forming part of the arm 6. To assist adjustment of the stop 7 the arm 6 may be calibrated or alternatively, and as shown on the drawings, the stop 7 may be of forked form, the feeler arm 9 being positioned between the two side portions thereof. In this construction the under face of the stop 7 is appropriately inclined and bears against a suitable part of the carrier 8 so that the operative face of the work stop is automatically brought to the correct position for the particular size of the workpiece to be measured. Thus, in general, it may be stated that the angle of inclination of the lower inclined face of the work stop 7 is disposed at an angle of $\tan^{-1} \frac{1}{2}$ relatively to the operative faec of the stop 7 lying at right angles to the arm 6.

The carrier 8 is provided with two spaced knife edges 11 conveniently of tungsten carbide, which press against one face of the slip gauges 10, while the other face of the latter presses against the knife edges 12, 14 at the root end of the fixed arm 6, the latter knife edges being at right angles to the edges 11. The feeler arm 9 carries a single knife edge 13 positioned opposite the knife edges 12, 14 at the free end of the fixed arm 6, which are at right angles to the knife edge 13. The carrier 8 and the arm 9 are formed of a metal having a low coefficient of thermal expansion such as the alloy known as Invar.

The carrier 8 is provided with a cover, and is guided by fitting between the guide bars 51 in such manner as to permit the plane of the knife edges 11 to be unconstrained within limits so as to allow the said plane to coincide with the plane of the contiguous face of the gauges 10.

A presser member 53 is slidable on the guide bars 51 and is adapted to be fixed in position therein by means of a holding screw 20, said presser member being divided near the bores which receive the guide bars as shown at 54 to restrain free movement of the member 53 and a spring pressed ball 50 or the equivalent adapted to press against the cover of the carrier 8, as shown in FIG. 1a.

Conveniently the feeler arm 9 is rigidly fixed in a slot in one end of the carrier 8. This end and consequently the said feeler arm is permitted a limited degree of movement relative to the rest of the carrier, by virtue of the provision of a deep oblique slot 21 defining said end of the carrier.

The end of the feeler arm 9 within the carrier 8 is connected to any suitable transducer for providing an alternating signal varying according to the displacement of the feeler and one suitable form of transducer device is described hereinafter with reference to FIGS. 2 and 3 and is also shown on FIGS. 5 and 6, but of course any other form of transducer device may be adopted.

It will be seen that the carrier 8 can be accurately preset to a position determined by the gauges 10 and that a workpiece presented between the feeler 9 and the arm 6 effects displacement of the feeler to provide an output signal which actuates a suitable responder such as an indicating meter (see for example FIG. 7) representative of the difference in size (plus or minus) between the gauge or gauges 10 and the workpiece.

In this type of mechanism it is obviously necessary to provide means for zero setting of the responder device or of the indicator meter under conditions corresponding to the gauging of a workpiece of the correct size and so that readings on the meter represent in fact differences from the standard (or gauge) size and the actual size of the workpiece.

An important feature of the present invention is that the casing 8 and the transducer assembly can be accurately preset by the gauge or gauges 10 according to the actual size of the workpiece so that only a comparatively restricted range of zero adjustment need be provided. A further important feature is the provision of two separate zero adjustment means (called "zero shift" means hereinafter) of this character, one of which is shown at 22 on FIG. 1 and a similar zero shift is provided on the opposite side of the apparatus. One of the two is calibrated in length units which may, for example, each represent half-scale deflection of the indicating meter, while the other is uncalibrated and conveniently offers a rather wider range of adjustment than the calibrated control shown at 22 on FIG. 1. The calibrations may, for example be $$+x,\ +\frac{x}{2},\ 0,\ -\frac{x}{2},\ -x$$

(where $x$ represents the full-scale reading of the indicating meter).

The manner in which these zero shift controls are employed will be referred to in greater detail hereinafter.

The construction shown in FIG. 2 of the drawings represents an alternative and preferred form of the comparator and comprises a hand held holder or stock 5 having a V-shaped support surface 56 and a projecting arm or anvil 61 at one end, the latter also having a V-support surface 62 to support a slidable forked work stop 71 for use when gauging round workpieces and similar in function to the work stop 7 in FIG. 1. In this case the under face of the work stop 71 is inclined at an angle $\beta$ to the stock 5 and the V-surface 62 of the anvil 61 is inclined at an angle $\alpha$ to the work-engaging surface of the anvil. The rear face of the work stop is slotted at 72 to accommodate a fixing screw 73 screwing into the anvil 61. If the angles $\alpha$ and $\beta$ are chosen according to the formula:

$$\cot \alpha = 2 + \tan \beta$$

the work-engaging face of the work stop 71 is positioned in the correct location for gauging circular workpieces by the feeler means hereinafter referred to.

The inclined under face of the work stop 71 is adapted to bear on a slider unit 81 housing the transducer mechanism and supporting a feeler 9 operatively similar to the feeler 9 on FIG. 1.

In this case the slider member 81 is slotted and is slidably supported upon the V-bed 56 of the stock 5 and is threaded at its lower end to accommodate a clamp nut 85, adapted to press a nylon washer or equivalent device against the base of the stock so as to retain the slider member 81 in an adjusted position.

The side faces of the stock 5 are recessed and covered by flush cover plates 25 to provide spaces to accommodate looped flexible leads 26 running from the transducer mechanism and continuing externally of the stock 5 at the rear. A suitably shaped curve-ended guide block 24 serves to control the positioning of the cables 26 when the slider member 81 is moved towards the maximum dimension position.

The arrangement of the transducer and the mounting for the feeler 9 is shown in detail on FIG. 3 of the drawings from which it will be seen that an end part of the slider member 81 includes an upper extension part 82 of cylindrical form divided into two parts separated by two thin blade-like portions 83 forming one section of a cross spring pivot for the suspension of the feeler 9. The two cylindrical portions 82 fit within a sleeve 84 transversely slotted from opposite sides in different planes to form the other section of the cross spring pivot regulating the movement of the feeler 9, the edges of the portions 83 being slightly set back as shown.

The adjacent portion of the slider member 81 is hollow and houses the transducer proper which comprises a coil winding assembly shown in greater detail on FIG. 5 and a U-shaped block 27 of conductive material, such as copper, or in some cases of magnetizable metal, positioned adjacent the coil windings and having a stem portion 28, the head part of which fits closely within a bore in the upper cylindrical part 82 beyond the cross spring section 83. The lower part of the stem 28 is slightly smaller than the bore in the lower cylindrical part to permit the U-shaped member 27 to move upon displacement of the feeler 9. In this case the feeler comprises a spherical ended screw fitted to the upper end of the sleeve 84.

The transducer winding assembly 29 is fixed to a metal or plastic carrier 30 and is traversed by a spherical headed screw 31 which also passes through the slider member 81. The screw 31 is adjustable for initial setting up and is then fixed by a lock nut 32. This setting up is to bring the slider member 81 into a correct reference position to ensure that the workstop 71 comes into correct operative position so that circular workpieces of all sizes are presented to the feeler 9 in correct diametral position. This adjustment is effected so that with the screw 31 against the anvil 61 the work contacting face of the workstop 71 is in line with the feeler 9. The latter is then adjusted (and held by its own lock nut 86) so it is deflected from its natural undeflected position to an intermediate position, which may be regarded as the zero or starting position for the feeler and the transducer. The spherical head of the screw 31 projects beyond the slider member 81 as shown in FIG. 2 at a point facing the anvil 61, the operative face portion of which is provided with three accurately lapped bearing surfaces for engagement with workpieces, gauge blocks and the like.

As in FIG. 1 of the drawings two separate zero shift means 22, 23 may be provided and are shown on FIG 3 of the drawings, and in this case comprise adjustable screws of conductive material or of magnetizable material, positioned on the two sides of the transducer and in the field thereof. They need not, however, be provided at this point but, rather, in association with the amplifier unit as indicated on FIGS. 6 and 7 of the drawings and such zero shift means have not therefore been shown also on FIG. 2 of the drawings.

The manner of using the device shown on FIG. 2 of the drawings comprises first positioning a gauge block, if necessary after removal of the work stop 71, between the spherical headed bearing screw 31 and the anvil 61, the slider member 81 being positioned to bring the screw 31 into light contact with the gauge block, after which the clamp nut 32 is tightened. This serves to bring the slider member 81 into an accurately predetermined position. The gauge block is now slid upwardly along the anvil into operative engagement with the feeler 9 after which the indicating meter 39 of the control unit can be set for a zero reading by adjustment of the uncalibrated zero shift 23 or the equivalent means associated with the amplification and output unit of FIG. 7, and with the calibrated zero shift 22 set to and left at zero. Because the member 81 can be preset by the gauge block to a predetermined position the zero shift means 22 and 23 do not require to have a very wide range of adjustment.

The comparator is now set ready for a measurement based on the gauge block initially used and after removal of such block. It will be understood that assuming the instrument has been correctly calibrated initially (an operation which will be referred to below), the indications given by the meter represent size differences, as compared with the gauge block, of successive workpieces presented between the anvil 61 and the feeler 9. Assuming round workpieces are in use the work stop 71 is held in a position determined by the engagement of the inclined under face thereof with the top of the slider member 81 which ensures that the workpiece is presented diametrically between the anvil 61 and the feeler.

The calibrated zero shift 22 permits off-scale readings to be brought on to the scale by setting the shift control to one of the marked positions, which has the effect of shifting the reading of the meter relatively to the scale so that the actual size reading is obtained by addition or deduction of the scale reading on the meter to or from the position of the calibrated control. It will, of course, be understood that hte indicating meter may serve merely for zero indication and the wanted size readings may be obtained by adjustment of the calibrated shift control, the result being then read off the scale of the calibrated control which is appropriately graduated. In this case, since the indicator meter merely performs determination of a zero condition, it could be replaced by any suitable zero indicating means capable of signalling to the operator that the zero condition has been reached. This could be, for example, an audible or visual indicator device.

The construction of one form of transducer is shown in FIG. 5 in a somewhat diagrammatic form as applied to a transducer providing a change in amplitude and phase appropriate to the circuit features represented in FIGS. 6 and 7. In this case three coils 35, 36 and 37 are wound on a magnetizable core, e.g. an iron dust core. The two outer coils are wound in opposite directions and connected in series, one end being earthed while the other provides an input or output connection. The centre coil is earthed at one end while the other end provides an output or input connection respectively. Various forms of transducer can of course be used; the movable element 27 may be of magnetizable material and the movable assembly may include a coil winding. Transducers may also be employed operating on different basis, for example where a movement produces a change of amplitude or frequency of an alternating current signal.

Referring now to the circuit diagram of FIG. 6, it will be seen that the measuring transducer is indicated in diagrammatic form and includes the two zero shift elements 22, 23 while FIG. 7 is intended to show part of a physically separate control unit. Conveniently the movement of the feeler 9 is sensed by a transducer providing a change of amplitude and phase, such as can be evaluated by a coherent detector. It will be understood that the signal obtained from the transducer is a function of the position of the element 27 and the phase of said signal changes through 180° as the signal passes through zero which may normally be regarded as the central position of the element 27. The coherent detector referred to is one which is polarised by a reference signal or signals received from the oscillator feeding the transducer, with the result that the phase of the signal received by the detector from the transducer determines the polarity of the detector output and the reversal of he phase as the feeler moves through the said zero point results in reversal of the sign of the output from the detector and the amplitude of the output depends on the amplitude of the signal. The phase of the signal received by the detector is arranged so that the maximum sensitivity of the detector is obtained. It should be noted that in this type of detector any spurious signals received which are in quadrature with the transducer output signal will not themselves affect the detector circuit, but if they are of sufficient amplitude they could cause overloading of the detector so far as the amplifier function of this detector is concerned with resulting non-linearity or loss of sensitivity. FIG. 6 represents the components associated with the comparator proper while FIG. 7 represents the components associated with the control and indicating unit. The latter includes an oscillator (conveniently of low radio frequency) feeding the transducer coil 36, and the other coils 35, 37 are connected to an amplifier, the output of which is delivered to a coherent detector. The oscillator may be a push-pull oscillator, and in this case control inputs to the detector are taken from anti-phase points of the oscillator in well known manner and the output of the detector is applied to a suitable meter 39. This meter may be of the centre zero type or at least it is calibrated with a centre zero while graduations on each side thereof represent small units of length. Alternatively, and because in workshop measurements the user is more concerned with over-size measurements than with under-size measurements, asymmetric marking may be adopted with a zero near one end, the major part of the scale providing a comparatively open marking for over-size readings.

Alternatively, any form of oscillator providing anti-phase outputs may be used; or a single-phase oscillator and an amplifier producing anti-phased outputs can be used, the detector then receiving both-phased outputs from the amplifier and a single phase control input from the oscillator.

It will, of course, be realised that the readings obtained on the meter for a given deflection of the feeler 9 are dependent on the gain of the amplifier and accordingly routine calibration of the instrument must be effected from time to time to bring the markings on the calibrated zero shift means into coincidence with the scale readings on the meter. The calibrations on the shift means 22 are determined and checked in manufacture and represent a definite and invariable change of output of the transducer, related to the physical characteristics of the transducer components, and once the zero shift has been calibrated in length units in production of the device, these calibrations remain effective and form a built-in fiducial or standard. The initial calibration may be performed individually with the assistance of suitable gauge blocks. The amplifier gain must, however, be occasionally adjusted to bring the meter readings into coincidence with the markings of the calibrated zero shift. This operation is a routine check which should be done from time to time by means of a gauge block which is used to set the movable member 81 as already explained and is then shifted to act on the feeler 9. Assuming the calibrated shift is set to zero the meter is then brought to zero by the operation of the uncalibrated shift. Then by adjusting the calibrated zero to its different markings a quick check can be made that the meter is reading correctly and any necessary corrections applied to the amplifier gain control to fit the meter scale into the scale of the calibrated control.

As indicated on FIG. 7 the calibrated and uncalibrated shift controls are not necessarily associated with the measuring transducer and they may alternatively be associated with the control unit as indicated in dotted lines. For this purpose a second transducer (not shown) of similar character can be employed in which two separate control means act upon a U-shaped block of copper or magnetizable material similar to the element 27 of FIG. 3 and positioned adjacent similar coil windings to those shown in FIG. 5, or adjuster screws similar to 22 and 23 of the measuring transducer can be used. A similar result may also be obtained by the provision of a pair of comparatively simple components affecting the electrical properties of the circuit, such as capacitors, inductors or resistors.

In some cases spurious quadrature signals may reach the amplifier and although such signals do not, as already stated, affect a coherent detector they may cause non-linearity of the amplifier output due to overloading, and it is preferable to provide means for compensating any quadrature signal that may be present. As shown a potentiometer is connected across the anti-phase outputs from the oscillator to provide a compensation signal of adjustable amplitude at the amplifier input.

When the instrument is first set up the output from the amplifier is applied to a suitable test instrument such as an oscilloscope or a valve volt meter and the zero shift controls and the quadrature balance controls adjusted together to give minimum total output from the amplifier, the gain being increased to maximum during this checking operation. With the total output reduced to the minimum it will be apparent that the quadrature component is also at the minimum and this setting will remain operative for the instrument under most normal operating conditions. It can, however, readily be re-checked when required.

What I claim is:

1. A measuring device comprising a body portion having a work-engaging face, a member slidable on said body portion and having a bearing face for engagement with a gauge means positioned between said bearing face and a part of said work engaging face to select the position of the slidable member for a given measurement, a displaceable feeler adapted co-operatively to engage a workpiece positioned between said slidable member and another part of the work engaging face of the body portion and means responsive to the movement of said feeler to provide an electric signal variable according to the position of said feeler.

2. A measuring device comprising a body portion having two relatively moving elements consisting of a projecting arm at one end providing an elongated bearing face, and a movable member slidable on said body portion and adapted to be retained in position thereon, said movable member having a bearing face adapted to engage a gauge placed in a first position between the said two elements to preselect the location of the movable member for a given measurement, a movable feeler projecting from one of said two elements toward the other element respectively so that a workpiece presented in a second position between the said two elements after the location of the movable member has been preselected imparts a movement to the feeler, an electric circuit transducer device operatively connected to the feeler to provide a change of circuit condition and an indicating device operated by said transducer according to the position of said feeler.

3. A measuring device according to claim 1 wherein means are provided to press said slidable member yieldingly against said gauge means to retain the slidable member in its selected position while workpieces are presented to the device for measurement by the movable feeler.

4. A measuring device according to claim 1 wherein screw-operated means are provided adapted to retain the slidable member in position on the body portion after the position of said member on the body portion has been selected by means of gauge means presented between the bearing face thereof and the work-engaging face and after the gauge means has been removed.

5. A measuring device according to claim 1 further comprising a workstop on the body portion for engaging round workpieces to be measured, the position of the operative face of such workstop relatively to the line connecting the points of engagement of the workpiece placed between the slidable member and the work-engaging face being so chosen that a circular workpiece is positioned with its diameter substantially coincident with said line.

6. A measuring device according to claim 5 wherein said workstop is provided with an inclined under face bearing upon the slidable member, the inclination of said under face being selected to cause the said operative face to adopt the correct position at every setting of the slidable member.

7. A measuring device according to claim 6 wherein the under face of the workstop bearing upon the slidable member is appropriately inclined and the body portion comprises a support for said workstop which is also inclined, both angles of inclination being chosen to position the operative face of the workstop in the correct position for every setting of the slidable member.

8. A measuring device according to claim 1 wherein the feeler engageable with the workpiece to be gauged is adapted to operate a transducer modifying the phase and amplitude of an alternating current input to provide an alternating current signal representative of the dimension to be gauged and is adapted to operate an indicator device.

9. Measuring equipment comprising a gauging device including a body portion having a projecting arm at one end providing an elongated bearing face, a movable member slidable on said body portion and adapted to be retained in position thereon, an element on said movable member adapted to engage a gauge positioned between the movable member and the projecting arm to select the position of the movable member for a given measurement, a movable feeler projecting from said movable member opposite the projecting arm and movable by a workpiece presented between the feeler and the projecting arm and a transducer device housed within the movable member and adapted to provide a signal varying according to the position of said feeler, said equipment further comprising a signal amplifier and means operated by said amplifier to respond to changes in said signal and to movement of the feeler.

10. Equipment according to claim 9 wherein the signal output from the transducer device is fed to a variable gain amplifier.

11. Equipment according to claim 9 wherein the transducer is of the type producing a change in amplitude and phase of an alternating input voltage and the output from the amplifier is fed to a coherent detector in turn operating an indicating meter calibrated to represent displacements of the feeler.

12. A measuring device of the comparator type comprising a body portion, a member slidable on said body portion, a displaceable feeler on said slidable member adapted co-operatively to engage a workpiece positioned between said feeler and the body portion to provide an electric signal variable according to the position of said feeler, indicator means responsive to said signal and two independently adjustable and independently operative zero adjusting means adapted to zeroise circuit elements of said responsive indicator means, one of said zero adjuster means being uncalibrated and the other being calibrated in length units.

13. A measuring device according to claim 12 wherein the calibrated zero adjusting means is calibrated in production of the device to provide a built-in fiducial to check calibration of the said responsive indicator means.

14. A measuring device according to claim 12 wherein the responsive means comprises an indicating meter operated by said signal according to the size of workpieces presented to the feeler, said meter being calibrated in length units.

15. A measuring device according to claim 14 wherein said meter embodies a centre zero calibration with markings corresponding to plus and minus values of size as deviations from a reference value.

16. A measuring device according to claim 13 wherein the calibrated zero adjusting means is marked with co-relative values corresponding to those of a meter forming said responsive means, said markings comprising zero markings and half and full-scale markings above and below zero.

17. A measuring device according to claim 13 wherein staid calibrated zero adjusting means is provided with a full set of graduation markings to provide the desired range of measurements and the device as a whole is associated with a zero indicating device to signal the zero condition to the operator upon adjustment of the calibrated zero adjuster so that the latter provides the required size reading.

18. A measuring device according to claim 12 wherein the responsive means is associated with a separate unit housing circuit components operable by the transducer, said unit comprising adjustable circuit elements including calibrated and uncalibrated zero adjuster means operative on the responsive means.

19. A measuring device according to claim 18 wherein the separate unit comprises a circuit device functionally similar to the transducer actuating the responsive means and embodies two independently movable elements providing the calibrated and uncalibrated zero adjuster means.

20. A measuring device according to claim 12 wherein the transducer comprises a balanced coil assembly and a physical movable element adjacent said assembly and consisting of metal and wherein the two zero adjuster means comprise independently movable elements physically positioned so as to provide an additional circuit influence upon the balanced coil assembly.

21. A measuring device according to claim 12 wherein the transducer comprises a relatively fixed balanced coil assembly, a U-shaped metallic member positioned adjacent said assembly and adapted to be moved by the movement of the feeler relatively to said assembly and a cross spring pivot providing a support for the feeler and for the U-shaped member.

22. A measuring device according to claim 21 wherein the cross spring pivot comprises a tubular member having an intermediate portion in the form of a blade spring and operatively connected at one end to a stem part forming an extension of the U-shaped member, said tubular member being housed within a sleeve having offset transverse cut-away parts adjacent the blade spring portion of the tubular member, the parts between said cut-away portions forming the second element of the cross spring, the first part being formed by the blade spring section of the tubular member.

23. A measuring device according to claim 21 wherein the balanced coil assembly is held in position within a movable member of the device by means of a spherical-ended holding screw which projects from said member towards said bearing face of the body and is intended for engagement by a gauge used for setting up the instrument, and wherein the operative face of the feeler is provided by a spherical-ended screw traversing the end of a slotted sleeve whereby movements are imparted to the sleeve by engagement of a workpiece with a spherical end of the feeler, which movements are imparted to the U-shaped member so as to affect the balanced coil assembly to provide a variable output signal.

24. A measuring device according to claim 18 wherein said device is connected to the separate unit by means of flexible leads, said unit comprising an oscillator providing an output fed to the transducer, an amplifier receiving an output from the transducer, a coherent detector responding to the output from the amplifier and polarised from the oscillator and an indicating meter, and wherein means are provided to introduce a controlled quadrature signal to compensate any spurious signals received by the amplifier.

25. A measuring device according to claim 24 wherein the flexible leads from the transducer mounted on a movable part of the body portion are looped within recesses on each side of the body, said recesses being covered by a slotted cover plate and said recesses each including an appropriately shaped part to guide the formation of the loop when the movable member is set towards the maximum dimension position while in other positions the spare connecting cable lies in a free loop within the recesses beneath the cover plate.

26. A measuring device comprising an elongated body to be held in the hand to present the device to a workpiece to be measured, a projecting arm at one end of said body, a slidable member on said body, said slidable member having a bearing face for engagement by a gauge positioned between it and the projecting arm for pre-selecting the position of the slidable member for a given measurement, clamp means to retain the preselected position of the slidable member, electrical means responsive to a workpiece to which the device is presented after preselection of the position of the slidable member, said electrical means including indicator means responsive to the measured dimension of the workpiece and zeroising means for setting the indicator means to zero indication when the device is presented to the said gauge, said zeroising means having a limited range sufficient to be effective only after preselection of the position of the slidable member by the gauge.

27. A measuring device according to claim 12 comprising means to accommodate a gauge to accurately preselect the position of the slidable member for a given measurement so that both zero adjuster means involve a limited range of adjustment sufficient to find the zero condition only after such accurate preselection of the position of the slidable member.

28. A device of the comparator type for measuring the dimensions of workpieces, comprising an adjustable body member adapted to be presented to the workpiece to be measured, a displaceable feeler on said body member adapted to respond to engagement with the workpiece, transducer means in said body member responding to the movement of said feeler to provide an electric signal variable according to the position of said feeler, indicator means responsive to said signal and two independently adjustable zero adjusting means adapted independently to zeroise said indicator means, one of said zero adjuster means being uncalibrated and the other being calibrated in dimensional units.

29. A device as claimed in claim 28 wherein the calibrated zero adjuster means is calibrated in production of the device so as to provide a built-in fiducial available as a permanent check on the calibration of the indicator means.

30. A device as claimed in claim 28 wherein the calibrated zero adjusting means comprises a physically adjustable member located in proximity to a circuit influencing member associated with the transducer, the effect of said adjustment being thus constant to serve as a permanent built-in fiducial available as a permanent check on the calibration of the indicator means.

31. A feeler mounting for a measuring gauge comprising a carrier body, a transducer coil assembly mounted in said carrier body, a tubular extension to said carrier body consisting of two cylindrical members with cut-away portions between them to form one section of a cross spring mounting the outer of the two cylindrical members having a bore, a sleeve-like member fitting to said tubular member, said sleeve-like member having oppositely disposed cross cuts with a thin web formed between them to provide a second element of the cross spring mounting, said sleeve-like member having firm engagement against the outermost cylindrical member of the tubular section while the other end of said sleeve-like member has firm engagement with the cylindrical section lying nearest the carrier body, an outwardly directed feeler fixed towards the outer end of said sleeve-like member, a stem portion traversing said tubular extension and in rigid engagement with the walls of said bore in the outer cylindrical member so as to permit said stem portion to move pivotally in response to engagement of the feeler with the workpiece, and a U-shaped conductor member on said stem movable relatively to the transducer mounted in said carrier body, said transducer being operatively connected to a responder unit including measuring means responding to the movement of the feeler.

References Cited in the file of this patent
UNITED STATES PATENTS

| | | |
|---|---|---|
| 1,593,753 | Darlington | July 27, 1926 |
| 1,924,435 | Homer | Aug. 29, 1933 |
| 2,720,617 | Sardella | Oct. 11, 1955 |
| 2,737,723 | Graham et al. | Mar. 13, 1956 |
| 2,829,320 | Dimond | Apr. 1, 1958 |
| 2,833,046 | Jeglum | May 6, 1958 |
| 2,857,626 | Wagner et al. | Oct. 28, 1958 |

FOREIGN PATENTS

| | | |
|---|---|---|
| 591,490 | Great Britain | Aug. 20, 1947 |